E. S. STACK.
BALL COCK.
APPLICATION FILED JAN. 6, 1909.
935,281.
Patented Sept. 28, 1909.
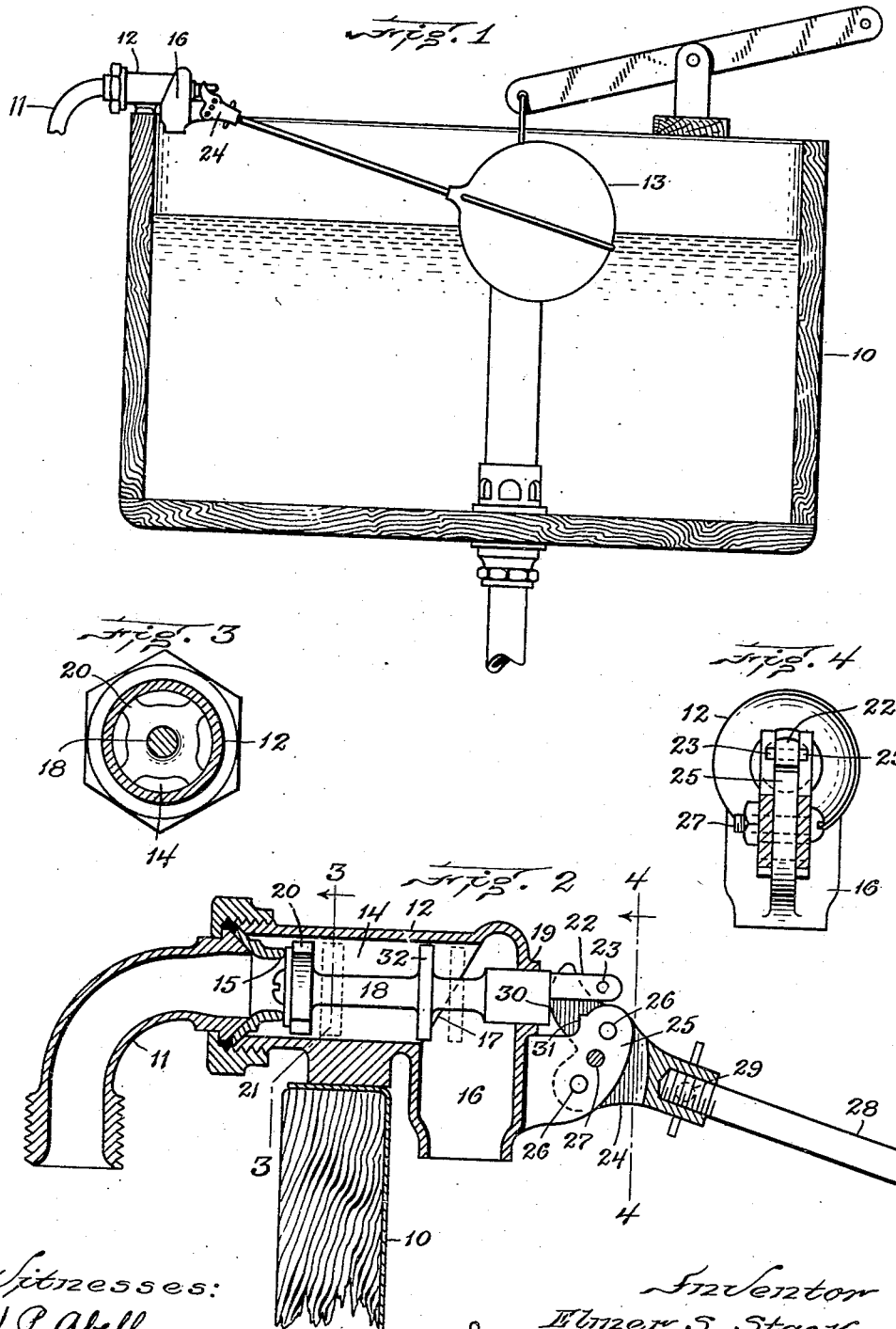
Witnesses:
W. P. Abell
F. R. Roulstone.
Inventor
Elmer S. Stack
by Wright Brown Quinby May
Attorneys

UNITED STATES PATENT OFFICE.

ELMER S. STACK, OF SOMERVILLE, MASSACHUSETTS.

BALL-COCK.

935,281.  Specification of Letters Patent.  Patented Sept. 28, 1909.

Application filed January 6, 1909. Serial No. 470,951.

*To all whom it may concern:*

Be it known that I, ELMER S. STACK, of Somerville, in the county of Middlesex and State of Massachusetts, have invented certain new and useful Improvements in Ball-Cocks, of which the following is a specification.

This invention has relation to valves for controlling liquid under pressure, and its chief object is to provide a valve adapted to open promptly in response to the actuating force and to overcome liability of leakage when closed. Incidentally to this feature, the invention seeks to provide a valve involving a comparatively small expense of manufacture by omitting a stuffing box for the valve stem and otherwise preventing the leakage of fluid from the valve casing when the valve is open. The construction and arrangement of the valve are such that one and the same means causes the three results mentioned, namely, promptness in opening, completeness of closing, and freedom from leakage past the valve stem. A valve so constructed is adapted to a variety of forms, among which are ball cocks and basin cocks or bibbs, the first named form being operated by a float, and the others by manual pressure.

Of the accompanying drawings, which illustrate a form adapted to be operated by a float,—Figure 1 represents a vertical section of a reservoir equipped with a valve or cock constructed in accordance with this invention. Fig. 2 is a longitudinal section showing the valve on a larger scale and in closed position. Fig. 3 is a section on the line 3—3 of Fig. 2. Fig. 4 is a section on the line 4—4 of Fig. 2.

The same reference characters indicate the same parts wherever they occur.

The numeral 10 indicates a reservoir such as a flush tank intended to contain a supply of water at a constant level.

11 indicates a supply pipe for water under suitable pressure, and 12 indicates the casing of a valve or cock for controlling the supply of water.

13 indicates a float by which the water supply in the tank is enabled to operate the valve.

The casing 12 is formed with a valve chamber 14 at one end of which the supply pipe is coupled with an inlet or valve seat 15. At the other end of the chamber is an outlet nozzle 16 extending laterally or downwardly, as the case may be. The outlet of the chamber is greater in diameter than the main body, and the juncture of the two is marked by a sharply defined shoulder 17.

18 indicates a valve stem which extends through the casing 12 and which has a bearing at 19. The inner end of the stem is formed with a spider 20 (see Fig. 3) which bears against the wall of the chamber, and which carries a valve 21 in the form of a washer, which is adapted to seat upon the inlet 15. The outer end of the stem 18 has an extension 22 with oppositely extending pins or projections 23. The extension is bestraddled by two toes of a bifurcated lever 24 which is mounted upon an ear 25 formed on the casing 12. The ear is provided with a plurality of apertures 26, into any one of which is inserted a fulcrum pin 27 for the lever. The lever has a plurality of apertures for the same purpose, which, in Fig. 2, register with the apertures 26. The lever has a screw-threaded socket in which one end of a float rod 28 is inserted and secured by means of a thumb screw 29. The toes of the lever are confined between the projections 23 and a shoulder 30 on the valve stem, but are constantly held in contact with the shoulder by the buoyancy of the float on the one side and the pressure against the valve on the other.

The closed position of the valve is indicated by full lines in Fig. 2 while the open position is indicated by dotted lines. The receding movement of the valve is limited by a stop 31 in the path of the shoulder 30. When the valve is open, the supply flows through the chamber 14 but is retarded by a disk 32 formed on or otherwise made a part of the stem 18. The disk is slightly less in diameter than the chamber and is preferably inclined relatively to the shoulder 17. In this form, however, the disk is perpendicular and the shoulder inclined to the path of movement of the valve. The disk is so positioned as to enter the outlet end of the chamber 14 only when the valve is against its seat, and to afford about one half of the full opening when the valve is farthest from its seat.

When the valve is open, the disk deflects the greater part of the water toward the mouth of the nozzle 16 and thus causes an ejecting action which draws out the water which flows between the opposite edge of the disk and the casing 12. In this way, the entire supply of water is discharged by way of the nozzle instead of leaking between the bearing 19 and valve stem.

By providing a plurality of apertures for the fulcrum 27, the cock is adapted to operate with various pressures of water. For a high pressure, the movement of the valve should be decreased by placing the fulcrum in the aperture nearest the valve stem, while for a low pressure, the movement should be correspondingly increased by placing the fulcrum farther from the stem. The simplicity of construction of the cock reduces the cost of manufacture to an extremely low point, and avoids the liability of becoming disarranged, but at the same time provides a long bearing for the valve mechanism and smooth connection with the operating lever.

Having thus explained the nature of my said invention, and described a way of making and using the same, although without attempting to set forth all of the forms in which it may be made or all of the modes of its use, what I claim is:

1. A cock comprising a casing formed with an inlet, an outlet, and a unitary passage from the inlet to the outlet, an inlet valve, and means movable with the valve for causing an ejecting action at the outlet.

2. A cock comprising a casing provided with an inlet and an outlet, an inlet valve, and means movable between the inlet and outlet for varying the flow and for causing an ejecting action at the outlet.

3. A cock comprising a chamber provided with an outlet terminating with an abrupt shoulder, and a disk inclined relatively to the shoulder and movable into and out of the end of the chamber.

4. A cock comprising a chamber having an inlet and an outlet, a valve for the inlet, and means for variably obstructing the outlet, said valve and means being movable so as to open in the direction of flow.

5. A cock comprising a chamber having an inlet and an outlet, an inlet valve opening with the flow, and means coupled with the inlet valve and movable in unison therewith for variably obstructing the outlet.

In testimony whereof I have affixed my signature, in presence of two witnesses.

ELMER S. STACK.

Witnesses:
E. BATCHELDER,
P. W. PEZZETTI.